US008768005B1

(12) United States Patent
Blesser

(10) Patent No.: US 8,768,005 B1
(45) Date of Patent: Jul. 1, 2014

(54) EXTRACTING A WATERMARK SIGNAL FROM AN OUTPUT SIGNAL OF A WATERMARKING ENCODER

(71) Applicant: The Telos Alliance, Cleveland, OH (US)

(72) Inventor: Barry A. Blesser, Belmont, MA (US)

(73) Assignee: The Telos Alliance, Cleveland, OH (US)

( * ) Notice: Subject to any disclaimer, the term of this patent is extended or adjusted under 35 U.S.C. 154(b) by 0 days.

(21) Appl. No.: 14/097,716

(22) Filed: Dec. 5, 2013

(51) Int. Cl.
*G06K 9/00* (2006.01)
*G10L 19/018* (2013.01)
*H04H 60/73* (2008.01)

(52) U.S. Cl.
CPC ............. *G10L 19/018* (2013.01); *H04H 60/73* (2013.01)
USPC .......................................................... 382/100

(58) Field of Classification Search
None
See application file for complete search history.

(56) References Cited

U.S. PATENT DOCUMENTS

| | | | |
|---|---|---|---|
| 5,029,217 A | 7/1991 | Chabries et al. | |
| 5,450,490 A | 9/1995 | Jensen et al. | |
| 5,483,276 A | 1/1996 | Brooks et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,764,763 A | 6/1998 | Jensen et al. | |
| 5,787,334 A | 7/1998 | Fardeau et al. | |
| 6,421,445 B1 | 7/2002 | Jensen et al. | |
| 6,571,144 B1 | 5/2003 | Moses et al. | |
| 6,621,881 B2 | 9/2003 | Srinivasan | |
| 6,683,958 B2 | 1/2004 | Petrovic | |
| 6,845,360 B2 | 1/2005 | Jensen et al. | |
| 6,862,355 B2 | 3/2005 | Kolessar et al. | |
| 6,871,180 B1 | 3/2005 | Neuhauser et al. | |
| 6,996,237 B2 | 2/2006 | Jensen et al. | |
| 7,222,071 B2 | 5/2007 | Neuhauser et al. | |
| 7,239,981 B2 | 7/2007 | Kolessar et al. | |
| 7,316,025 B1 | 1/2008 | Aijala et al. | |
| 7,395,211 B2 * | 7/2008 | Watson et al. | ................. 704/500 |
| 7,471,987 B2 | 12/2008 | Crystal et al. | |
| 7,483,835 B2 | 1/2009 | Neuhauser et al. | |
| 7,483,975 B2 | 1/2009 | Kolessar et al. | |

(Continued)

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Hadi Akhavannik
(74) *Attorney, Agent, or Firm* — Renner, Otto, Boisselle & Sklar, LLP.

(57) ABSTRACT

A device for extracting a watermark signal from an output signal of a watermarking encoder in which the output signal includes an input signal portion corresponding to an input signal to the watermarking encoder and a watermark signal portion corresponding to the watermark signal includes an input configured to receive the input signal and the output signal. The device further includes an adjustment signal generator configured to generate a gain adjustment signal and a delay adjustment signal based on the input signal and the output signal, a gain and delay adjustor configured to adjust gain and delay of the output signal or the input signal based on the gain adjustment signal and the delay adjustment signal, respectively, to generate an adjusted output signal or an adjusted input signal, respectively, and an output configured to transmit a difference between the input signal and the adjusted output signal or a difference between the adjusted input signal and the output signal as the watermark signal.

20 Claims, 6 Drawing Sheets

(56) References Cited

U.S. PATENT DOCUMENTS

| | | |
|---|---|---|
| 7,640,141 B2 | 12/2009 | Kolessar et al. |
| 7,961,881 B2 | 6/2011 | Jensen et al. |
| RE42,627 E | 8/2011 | Neuhauser et al. |
| 8,099,285 B2 | 1/2012 | Smith et al. |
| 2003/0128861 A1* | 7/2003 | Rhoads .......... 382/100 |
| 2003/0231785 A1* | 12/2003 | Rhoads et al. ......... 382/100 |
| 2005/0157907 A1* | 7/2005 | Reed et al. .......... 382/100 |
| 2009/0262932 A1 | 10/2009 | Petrovic |
| 2011/0093104 A1 | 4/2011 | Blesser |
| 2012/0274459 A1 | 11/2012 | Jaisimha et al. |

OTHER PUBLICATIONS

Blesser, Barry, Director of Engineering, 25-Seven Systems, Inc.; Technical Properties of Arbitron's PPM System; pp. 1-8; Aug. 18, 2009.

Non-Final Office Action for U.S. Appl. No. 14/145,681 dated Feb. 20, 2014.

* cited by examiner

EXTRACTING A WATERMARK SIGNAL FROM AN OUTPUT SIGNAL OF A WATERMARKING ENCODER

FIELD OF THE INVENTION

The present disclosure relates to audio processing. More particularly, the present disclosure relates to methods and systems for extracting a watermark signal from an output signal of a watermarking encoder.

BACKGROUND

An audio watermark is a type of digital watermark—a marker embedded in an audio signal. Audio watermarking is the process of embedding information in audio signals. To embed this information the original audio may be changed or new components may be added to the original audio. Watermarking applications include the embedding audio sound samples with digital information about its ownership, distribution method, transmission time, performer, producer, legal status, etc.

In order to embed the digital bits that make up the identification code, watermarking modifies the original audio by adding new content or changing existing audio components. The ideal audio watermarking system is 100% reliable in terms of embedding and extracting the watermarking data in all "typical" listener scenarios while remaining 100% inaudible for all "typical" program material. These goals underscore a paradox: 100% encoding reliability likely requires audible watermarks. Conversely, to achieve total inaudibility, watermarks cannot be present at all on some material, which clearly sacrifices reliability. Trade-offs must always be made in audio watermarking systems to balance audibility and reliability.

The Portable People Meter™ (PPM™) system by The Arbitron Company is an example of a watermarking system. The Arbitron PPM system embeds watermarks with station identification codes into the audio program at the time of broadcast using an encoder in each individual radio station's transmission chain. Portable PPM decoders then identify which stations the wearers of the decoders or "people meters" are listening to.

A watermarking technology that is used to track listeners of radio programs such as PPM is more likely to need close to 100% reliability of data extraction even if some audio is broadcasted with modest perceptible degradation. The reason for requiring 100% reliability is that failures in reliability are not uniformly spread across the broadcast population. For example, a system that is 99% reliable over all announcers, program types, and listening devices, may have the 1% of failures concentrated in a particular radio announcer or a particular radio show or type of music from, for example, a particular cultural tradition. Listener ratings for the particular radio announcer, the particular radio show or type of music would drop, resulting in a loss of advertising revenue and the eventual cancellation of the affected programming. Clearly, large amounts of money are at stake on reliability.

Therefore, ensuring that audio leaving the station is optimized for successful watermarking encoding/decoding is important. There is a need for a system that individual radio broadcasters, the originators of the terrestrial signal, can utilize to control the trade-off between higher reliability of watermark extraction and higher audible degradation.

A first step towards more control of these trade-offs may be to extract the watermark signal from the output of the encoder such that analysis may be conducted to better understand the effects of watermarking and perhaps control them to the broadcaster's benefit.

One potential approach to extracting the watermark signal would be to attempt to simply subtract the input of the watermarking encoder from its output to obtain the watermark signal. This approach, however, is ineffective because the watermarking encoder introduces changes between the input and output signals that make simple subtraction inaccurate to the point that it is useless.

An approach for compensating for the changes through the encoder to allow for accurate subtraction may be based on a class of technology called adaptive filters. This technology iteratively finds the coefficients of the optimum filter that minimizes the difference between a) the input to the encoder as compensated by the filter and b) the actual encoder output. This approach, however, is also ineffective for several reasons. First, the encoding process involves more than just a change in gain and delay because it also adds the watermarking signal which is unknown and time-varying over a potentially large part of the spectrum. A filter cannot fully compensate for these changes. Second, the convergence of the adaptive filter to an optimum depends very strongly on the spectrum of the input signal, which is also unknown and rapidly changing. As a result, the optimization may produce only small errors between input and output, but small components at some frequencies may be more important than larger components at other frequencies. Therefore, adaptive filters, which are well known in the art, would not solve the problem.

A more nuanced approach would be to understand and compensate for the internals of the watermarking encoder to account for the changes between the input and output signals. This approach, however, is impractical at least because a) the internals of the watermarking encoders are not well understood by people other than the manufacturers of the encoders and, perhaps more importantly, b) a watermark extracting system should ideally be able to extract the watermark independently of the internals of any particular implementation of watermarking by a particular encoder.

SUMMARY OF THE INVENTION

The present disclosure provides devices and method to be used in conjunction with an existing watermarking encoder that was designed, owned, or licensed by a third party to effectively extract the watermarking signal from the output of the encoder. Typically, the encoder is provided to a user such as a radio station and the station supplies the input audio program which is to be watermarked to the encoder. The station then uses the output audio program after watermarking to feed a transmitter or Internet distribution system. Because the properties of the encoder are unchangeable and likely unknown to the user, the present disclosure provides means to extract the watermark without having access to the encoder's specific internal operations.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Although the present disclosure describes various embodiments in the context of watermarking station identification codes into the station audio programming to identify which stations people are listening to, it will be appreciated that this exemplary context is only one of many potential applications in which aspects of the disclosed systems and methods may be used.

Figure 1:
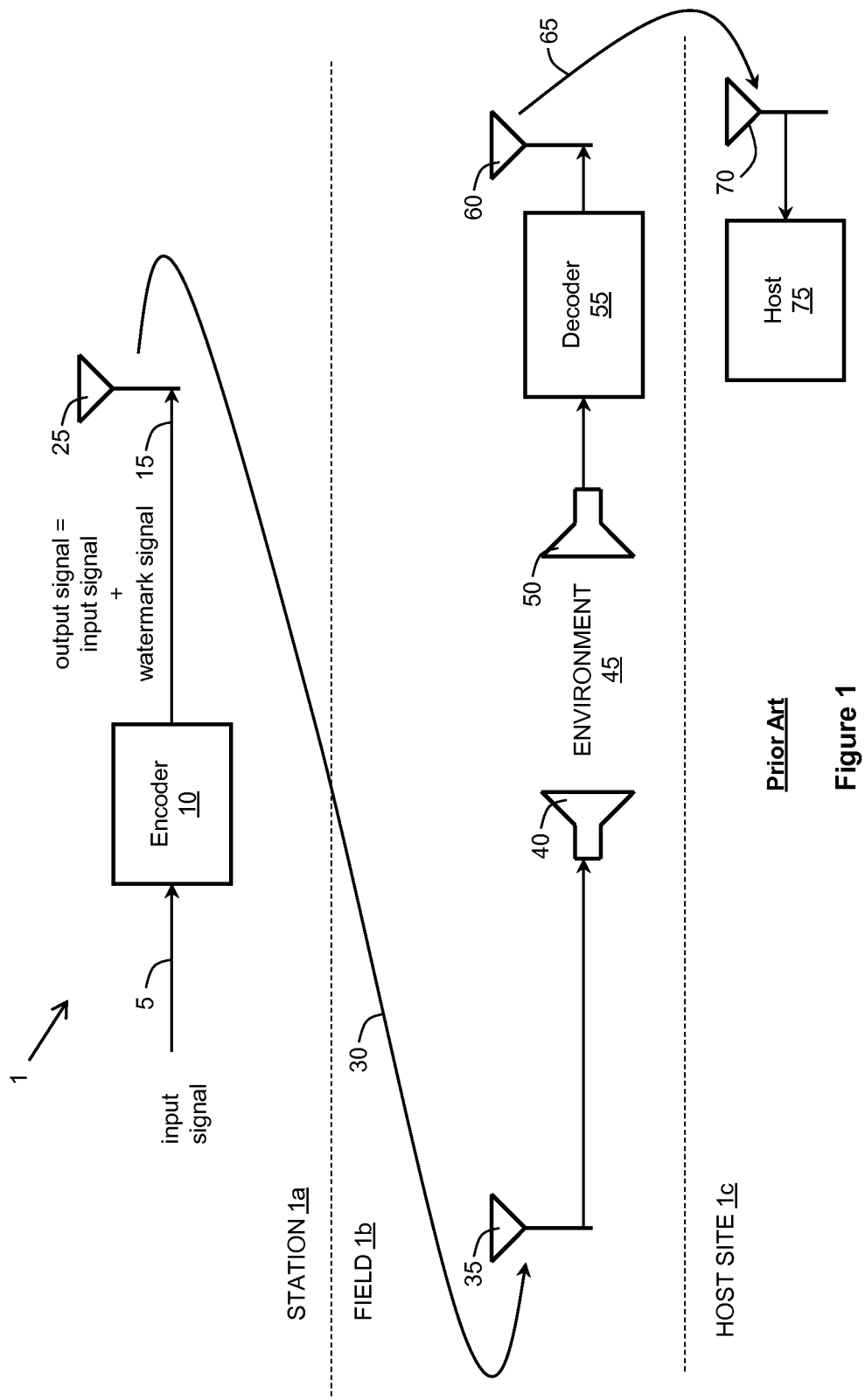
FIG. 1 illustrates a simplified block diagram of an exemplary prior art system for electronic watermarking.

FIG. 1 illustrates a simplified block diagram of an exemplary prior art system 1 for electronic watermarking. The system 1 includes at least two portions, a portion at the station 1a and a portion at the field 1b. The station 1a corresponds to the facilities where broadcasting takes place. The field 1b corresponds to the places where listeners listen to the broadcast. The field 1b could be a home, place of work, car, etc.

The main component of the watermarking system 1 at the station 1a is the watermarking encoder 10. One example of a watermarking encoder 10 is the encoder that forms part of the Portable People Meter™ (PPM™) system by The Arbitron Company. The encoder 10 receives the input signal 5 which is the source signal that the station intends to broadcast. The encoder 10 receives and watermarks the input signal 5. That is, the encoder 10 receives the input signal 5 and embeds watermarks with station identification codes onto the audio program in the input signal 5. The result is the output signal 15, which includes the information in the input signal 5 (or at least most of the information in the input signal 5) and the watermark signal 20. The modulator/transmitter 25 at the station 1a broadcasts the transmission 30, which includes the information in the output signal 15, through the air, internet, satellite, etc.

In the field 1b the receiver/demodulator 35 receives and demodulates the broadcast transmission 30 and transmits a corresponding signal to be transduced by the loudspeaker 40 into the environment 45. The combination of the receiver/demodulator 35 and the loudspeaker 40 could be, for example, an AM/FM radio. The environment 45 may vary with the field 1b (e.g., home, place of work, car, etc.), the time of day (e.g., high traffic, low traffic), etc.

The transducer 50 (e.g., a microphone) receives the output of the loudspeaker 40 as modified by the environment 45 and transmits a corresponding signal to a decoder 55. The decoder 55 decodes the received signal to, hopefully, obtain the watermark or the information within the watermark. The transmitter 60 may then transmit any detected watermark or the information within the watermark. The output of the decoder 55 and the signal 65 transmitted by the transmitter 60 include decoded information to be transported to a host 75 at a host site 1c who is managing the watermarking system to identify the station to which the user at the field 1b is listening. Although the transmitter 60 and the receiver 70 are shown as antennae in FIG. 1, transportation of the decoded information 65 may not be a broadcast but may be instead a private communication via telephone, internet, email module, etc.

As described above, ensuring that the audio signal 30 broadcasted by the station 1a is optimized for successful watermark decoding in the field 1b is important. There is a need for a system that radio broadcasters, for example, may utilize to shift the trade-off between audible signal degradation due to the watermarking and reliability of watermark extraction. Extracting the watermark signal 20 from the output signal 15 of the encoder 10 may be helpful to analyze and better understand the watermarking process, and perhaps attempt to control it to the broadcaster's benefit.

As described above, simply subtracting the input of the watermarking encoder 10 from its output to obtain the watermark signal 20 is ineffective because the watermarking encoder 10 introduces effects such as delay, gain variations, frequency or phase changes, etc. between the input and output signals. Moreover, an ideal watermark extracting system would be able to extract the watermark independently of the internals of any particular encoder.

Figure 2:
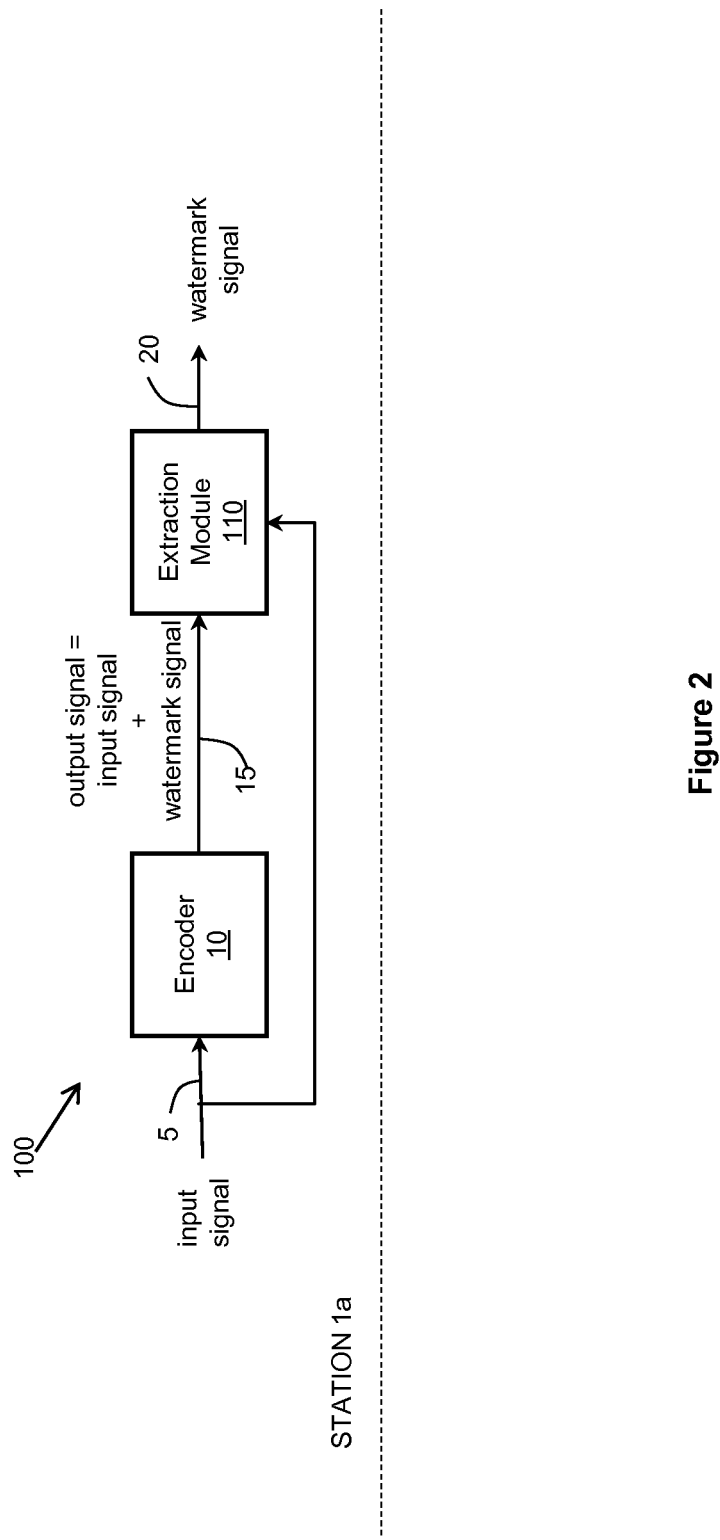
FIG. 2 illustrates a simplified block diagram of an exemplary system for audio watermark extraction.

FIG. 2 illustrates a simplified block diagram of an exemplary system 100 for audio watermark extraction. The system 100 includes the encoder 10 as described above and an extraction module 110. The extraction module 110 receives the input signal 5 and the output signal 15. From manipulation of those signals the extraction module 110 effectively extracts the watermark signal 20. Thus, the extraction module 110 compensates for changes in the input signal portion of the output signal 15 introduced by the watermarking encoder 10 substantially without regard to the internals of the specific encoder 10.

Figure 3:
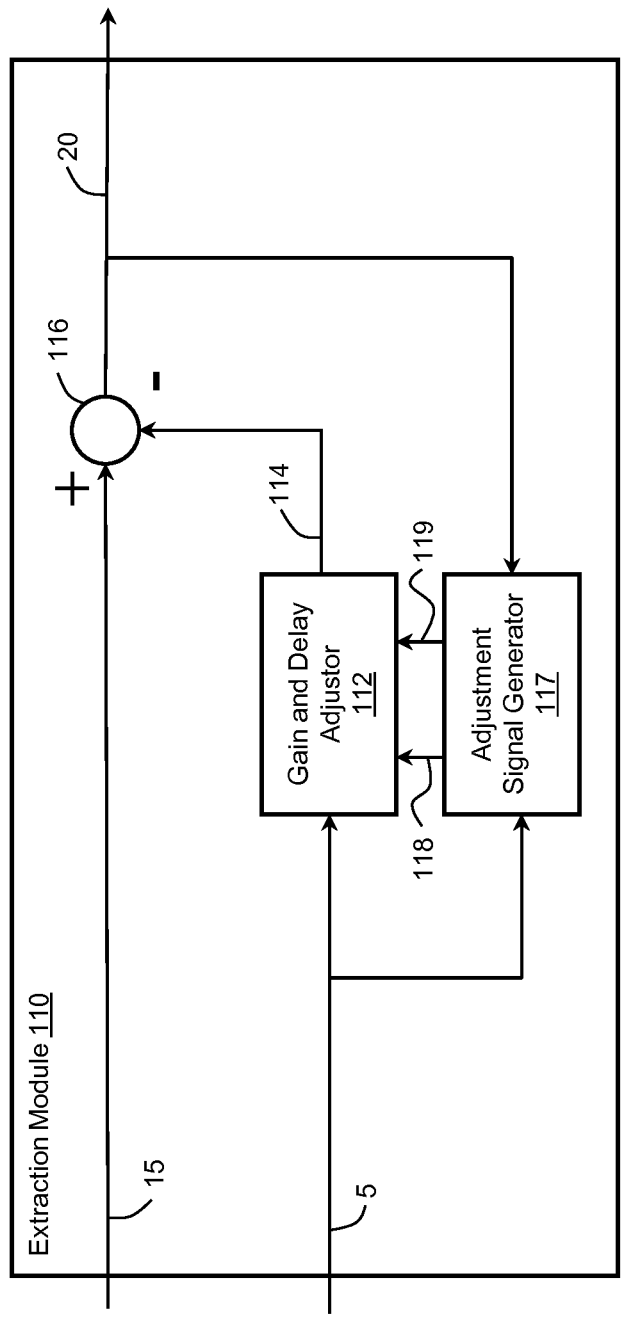
FIG. 3 illustrates a simplified block diagram of an exemplary watermark extraction module for extracting a watermark signal from an output signal of a watermarking encoder.

FIG. 3 illustrates a simplified block diagram of an exemplary watermark extraction module 110 for extracting a watermark signal 20 from an output signal 15 of a watermarking encoder 10. The extraction module 110 receives the input signal 5 and the output signal 15.

The extraction module 110 includes a gain and delay adjustor 112. The adjustor 112 receives the input signal 5 and adjusts its gain and delay to match the gain and delay of the output signal 15 created by the encoder 10. The output of the adjustor 112 is the adjusted input signal 114 which corresponds to the input signal 5 adjusted to compensate for changes in gain and delay in the output signal 15 introduced by the watermarking encoder 10.

The extraction module 110 also includes a subtractor 116 that subtracts the adjusted input signal 114 from the output signal 15 to obtain the watermark signal 20.

The extraction module 110 further includes an adjustment signal generator 117 that receives the input signal 5 and the watermark signal 20 to generate a gain adjustment signal 118 and a delay adjustment signal 119 based on the received signals. The adjustor 112 receives the gain adjustment signal 118 and the delay adjustment signal 119 in addition to the input signal 5, and adjusts gain and delay of the input signal 5 based on the gain adjustment signal 118 and the delay adjustment signal 119, respectively, to generate the adjusted input signal 114.

The extraction module 110 outputs the difference between the output signal 15 and the adjusted input signal 114 as the watermark signal 20.

In another embodiment (not shown), the adjustor 112 may receive the output signal 15 and adjust its gain and instead of adjusting the gain and delay of the input signal 5. In this embodiment, the output of the adjustor 112 is an adjusted output signal which corresponds to the output signal 15 adjusted to compensate for changes in gain and delay introduced by the watermarking encoder 10. The subtractor 116 may then subtract the input signal from the adjusted output signal to obtain the watermark signal. In this embodiment, the extraction module 110 may include a delay block to delay the input signal 5 before it is input to the encoder 10 to allow time for adjusting gain and delay of the output signal 15. The delayed input signal 5 may be applied to the adjustment signal generator 117 and the input signal 5 to the encoder 10 or viceversa. The adjustment signal generator 117 receives the input signal 5 and the signal 20 to generate a gain adjustment signal and a delay adjustment signal based on the received signals. The adjustor 112 receives the gain adjustment signal 118 and the delay adjustment signal 119 in addition to the output signal 15, and adjusts gain and delay of the output signal 15 based on the gain adjustment signal 118 and the delay adjustment signal 119, respectively, to generate the adjusted output signal. In this embodiment, the adjustor 112 may also compensate for the delay introduced in the input signal 5 by the delay block. The extraction module 110 outputs the difference between the adjusted output signal and the input signal as the watermark signal 20.

Figure 4:
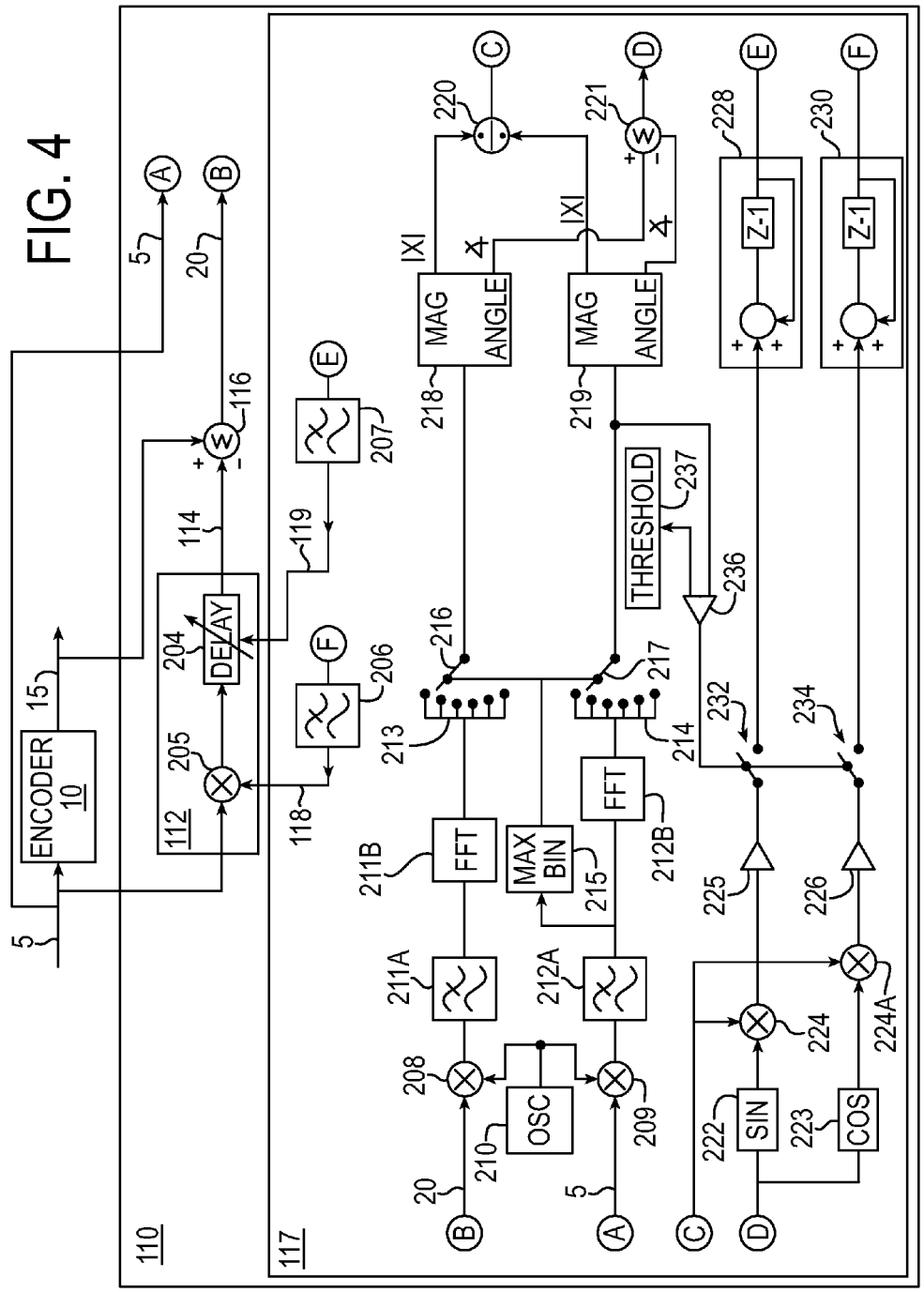
FIG. 4 illustrates a detailed block diagram of the exemplary watermark extraction module for extracting a watermark signal from an output signal of a watermarking encoder.

FIG. 4 illustrates a detailed block diagram of an exemplary watermark extraction module 110 for extracting a watermark signal 20 from an output signal 15 of a watermarking encoder 10. As described above, the extraction module 110 includes the gain and delay adjust 112, and the adjustment signal generator 117 that receives the input signal 5 and the watermark signal 20 and generates a gain adjustment signal 118 and a delay adjustment signal 119 to provide to the adjustor 112. The adjustor 112 receives the gain adjustment signal 118 and the delay adjustment signal 119 in addition to the input signal 5, and adjusts gain and delay of the input signal 5 based on the gain adjustment signal 118 and the delay adjustment signal 119, respectively, to generate the adjusted input signal 114. The subtractor 116 subtracts the adjusted input signal 114 from the output signal 15 to obtain the watermark signal 20.

As described in more detail below, in one embodiment (not shown) the adjustment signal generator 117 operates in multiple spectral regions such that the operation of generating the gain adjustment signal 118 and the delay adjustment signal 119 is performed multiple times (e.g., in parallel), at least once for each of the multiple spectral regions. For example, the adjustment signal generator 117 may generate a first gain adjustment signal and a first delay adjustment signal corresponding to frequencies from 0 to 500 Hz and a second gain adjustment signal and a second delay adjustment signal corresponding to frequencies from 500 to 1000 Hz, and so on. The exemplary illustration of FIG. 4 assumes that the encoder 10 may be modeled as a single gain and a single delay. To achieve better performance, however, if needed or if that assumption is not valid, the adjustment signal generator 117 may generate a gain adjustment signal and a delay adjustment signal for each of the multiple spectral regions or frequency ranges.

In the illustrated embodiment of FIG. 4, the gain and delay adjustor 112 includes a variable delay 204 and a multiplier 205. The multiplier 205 receives the gain adjustment signal 118 while the variable delay 204 receives the delay adjustment signal 119 from the adjustment signal generator 117.

The feedback in the adjustment signal generator 117 varies the gain and delay adjustments signals 118 and 119 to adjust gain and delay of the input signal 5 such that, at frequencies of the input signal 5 at which the encoder 10 is not likely to embed a watermark, the difference between the output signal 15 and the adjusted input signal 114 (i.e., the signal 20) is zero. That is, at frequencies of the output signal 15 at which the encoder 10 does not embed a watermark, energy in the signal 20 is attributed to error in the subtraction. At frequencies of the output signal 15 at which the encoder 10 does not embed a watermark, any difference between the input signal 5 and the input signal portion of the output signal 15 is fully attributable to effects introduced by the encoder 10 and not to any watermarking. If the gain and delay adjustments signals 118 and 119 matched the actual properties of the encoder 10, the signal 20 would be zero. The feedback loop of the adjustment signal generator 117 continuously adjusts the gain and delay adjustments signals 118 and 119 until the error at these frequencies is approximately zero.

At least during acquisition of the gain and delay adjustments signals 118 and 119 (e.g., calibration), the watermark extraction module 110 operates under the assumption that the input signal 5 is of a nature (e.g., spectral characteristics) that does not cause the encoder 10 to embed a watermark. Therefore, in the acquisition of the gain and delay adjustments signals 118 and 119 the signal 20 does not include a watermark. In the acquisition of the gain and delay adjustments signals 118 and 119 the signal 20 corresponds to an error signal that represents the difference between the output signal 15 and the adjusted input signal 114. In contrast, outside of the acquisition of the gain and delay adjustments signals 118 and 119 the signal 20 corresponds to the watermark embedded by the encoder 10.

Therefore, the present disclosure refers to the signal 20 as the watermark signal 20 or the error signal 20 depending on the context. At least in the context of acquisition of the gain and delay adjustments signals 118 and 119 (e.g., in a calibration context), the signal 20 corresponds to an error signal, and thus the signal 20 is referred to as the error signal 20. Outside of acquisition of the gain and delay adjustments signals 118 and 119 (e.g., outside of the calibration context), the signal 20 corresponds to the extracted watermark, and thus the signal 20 is referred to as the watermark signal 20. The same signal, the signal 20, may have two different meanings depending on the context.

As described below, in order for the feedback loop to operate properly, it may be required that the input signal 5 includes some energy in a particular frequency (i.e., the frequency of operation of the feedback loop). The frequency of operation the feedback loop is also selected such that the feedback loop operates at a frequency at which the encoder 10 does not embed a watermark.

In the illustrated embodiment, the adjustment signal generator 117 includes multipliers 208 and 209, and a complex oscillator 210, which together function as a complex demodulator to the oscillating frequency of the oscillator 210. The complex oscillator 210 generates a complex signal $\sin(\omega t)+j\cos(\omega t)$ and the multipliers 208 and 209 multiply the error signal 20 and the input signal 5, respectively, to the complex signal. By working in the complex domain, the multiplication preserves the phase and magnitude of the error signal 20 and the input signal 5. Essentially, the components of the error signal 20 and the input signal 5 corresponding to the oscillating frequency of the oscillator 210 are moved to be centered around 0 Hz with both amplitude and phase information preserved. These vectors are then low passed filtered in 211A and 212A as complex numbers. The error signal 20 and the input signal 5 are effectively demodulated to the oscillating frequency of the oscillator 210 to become complex vectors, an input signal vector and an error signal vector, that each includes amplitude and phase information.

The fast Fourier transform (FFT) decomposition module 211B produces n input signal FFT bins and, thus, effectively produces n pairs of vectors, one pair for each FFT bin. Similarly, the FFT decomposition module 212B produces n error signal FFT bins and, thus, effectively produces n pairs of vectors, one pair for each FFT bin. The peak bin detector 215 extracts the index to the FFT bin with the highest energy in the input signal FFT bins corresponding to the input signal 5. Selectors 216 and 217 select the bin with the highest energy and the outputs from 216 and 217 are single complex vectors each with a magnitude and angle in the form of a +jb.

Magnitude and phase modules 218 and 219 convert each of the complex vectors into an equivalent pair of numbers representing magnitude and angle. Divider 220 determines the ratio of the two magnitudes. The subtractor 221 computes the phase difference between the two angles. The angle difference is the input to a sine converter 222 and a cosine converter 223. The output of the sine converter 222 is multiplied at 224 times the ratio of the magnitude of the highest energy input signal bin and the magnitude of the error signal bin corresponding to the highest energy input signal bin to obtain a phase error. The output of the cosine converter 223 is multiplied at 224a times the ratio of the magnitude of the highest energy input signal bin and the magnitude of the error signal bin corresponding to the highest energy input signal bin to obtain a gain error. The calculated gain error and phase error form a normalized error vector that represents gain and phase error of the error signal 20 relative to input signal 5.

Based on the gain error and the phase error, the gain adjustment signal 118 and the delay adjustment signal 119 may be generated. The gain and phase error are scaled in 225 and 226 which serve as the loop gain constants for the two loops. These scaled error signals are then integrated or accumulated in 228 and 230. The outputs of the accumulators or integrators 228 and 230 are low passed filtered at 206 and 207 and the output of the low pass filters 206 and 207 are the gain adjustment signal 118 and the delay adjustment signal 119 closing the feedback loop.

In summary, the error signal 20 (i.e., the watermark signal) is normalized to the input signal 5 so that the ratio is independent of the input amplitude. That normalized error signal as a complex vector is then decomposed into a gain error and a phase error to drive the two feedback loops.

In one embodiment, prior to normal operation the adjustment signal generator 117 is calibrated using a calibration signal. For example, an 800 Hz sinusoidal signal may be used as the input signal 5 as a calibration signal. In this example, the oscillator 210 may also operate at 800 Hz. Once the adjustment signal generator 117 is calibrated (i.e., the error signal 20 is zero under calibration conditions), normal operation of the extraction module 110 may resume.

In another embodiment, no calibration procedure is used. The extraction module 110 would operate effectively and is self-calibrating as long as the input signal 5 has some energy near the oscillating frequency (e.g., 50 Hz, 100 Hz, 200 Hz, 400 Hz, 800 Hz, 1000 Hz, 2000 Hz, etc.) of the complex oscillator 210. If the input signal 5 has energy near the oscillating frequency of the complex oscillator 210, the two feedback loops of the adjustment signal generator 117 operate effectively. If the input signal 5 does not have sufficient energy near the oscillating frequency of the complex oscillator 210, the two feedback loops may be suspended and the values for gain and delay adjustment signals 118 and 119 retained from the previous calculation. The feedback loops may operate whenever there is energy near the oscillating frequency of the complex oscillator 210 if the oscillating frequency of the complex oscillator 210 also corresponds to a frequency at which the encoder 10 does not generate or embed watermarks. In some embodiments, watermarking is in discrete spectral channels with no energy between those channels.

In the embodiment of FIG. 4, the adjustment signal generator 117 includes the switches 232 and 234, and the comparator 236. If the energy of the highest energy input signal bin is above a threshold 237 as determined by the comparator 236, the switches 232 234 are closed so that the integrator 230 may integrate the gain error (or the scaled gain error) to obtain the gain adjustment signal 118 and so that the integrator 228 may integrate the phase error (or the scaled phase error) to obtain the delay adjustment signal 119. If, however, the energy of the highest energy input signal bin is below the threshold 237 as determined by the comparator 236, the switches 232 and 234 are opened so that the integrators 228 and 230 may generate the gain adjustment signal 118 and the delay adjustment signal 119 as current values. In one embodiment, the threshold 237 corresponds to the energy of the remaining input signal bins. If the energy of the highest energy input signal bin is larger than the energy of the remaining input signal bins, integration proceeds. If the energy of the highest energy input signal bin is not larger than the energy of the remaining input signal bins, integration is suspended. Since the gain and delay errors are expected to be slowly changing, suspending changes in the compensation is commonly not a problem.

In the embodiment described above in reference to FIG. 4 the oscillating frequency of the oscillator 210 may be set to a value corresponding to a frequency of the output signal 15 at which the encoder 10 is not likely to embed a watermark. The oscillating frequency of the oscillator 210 is also set taking into account phase wrap. For example, if the oscillating frequency of the oscillator 210 is set to 800 Hz, the embodiment described will only work with delay errors lower than 1.25 ms. That is because 800 Hz has phase wrap at 1.25 ms and thus, if the oscillating frequency of the oscillator 210 is set at 800 Hz, the adjustment signal generator 117 cannot tell the difference between a delay of 0 ms, 1.25 ms, 2.50 ms, etc. because each of them maps to a phase of 0 at 800 Hz. If the oscillating frequency of the oscillator 210 is set instead at 300 Hz, for example, the adjustment signal generator 117 works to detect delay errors up to below 3.33 ms.

Similarly, if very high precision is required, the oscillating frequency of the oscillator 210 may be set to higher frequencies, such as for example 3.5 kHz, for very accurate fine tuning of the adjustment signal generator 117. The high frequency setting for the oscillating frequency of the oscillator 210 allows for very accurate adjustments of even very small differences in delay. However, the high frequency setting for the oscillating frequency of the oscillator 210 does not allow for adjustment of even relatively modest differences in delay because of the phase wrap (e.g., up to 0.285 ms at 3.5 kHz).

For this reason, there may be multiple target frequencies for the loop (i.e., the oscillating frequency of the oscillator 210). Lower frequencies may not provide good accuracy but they may address the phase wrap, while higher frequencies may be more accurate.

In one embodiment (not shown), the watermark extracting module 110 includes multiple adjustment signal generators such as the adjustment signal generator 117 and the watermark extracting module 110 combines the outputs of the multiple adjustment signal generators. For example, the oscillating frequency of a first oscillator 210 may be set to 800 Hz while the oscillating frequency of a second oscillator may be set to, for example, 300 Hz which would allow for larger ranges of possible delays. The multiple adjustment signal generators allow for disambiguating the conversion of phase to delay. While the phase at 800 Hz of 1.25 ms matches that of 0 ms, that will not be true at 300 Hz, for example. In another embodiment, the oscillating frequency of a second oscillator or a third oscillator may be set to, for example, 50 Hz. Similarly, for very accurate fine tuning an additional adjustment signal generator with an oscillating frequency of set at a higher frequency such as, for example, 3.5 kHz. Multiple adjustment signal generators produce multiple vectors which may then be processed in a combiner module to effectively combine their outputs and allow for very accurate fine tuning of even relatively large differences in delay. The additional complexity for using multiple frequencies may only be used in cases where necessary.

The embodiment described above in reference to FIG. 4 assumes a 2nd order behavior of the encoder 10 and thus provides a single gain and delay over the full spectrum for the gain and delay correction of the extraction module 110. In other embodiments, the delay in the encoder 10 may be assumed as a higher order system in which delay changes with frequency. In one embodiment (not shown), the delay 204 may be replaced by a variable low-pass filter to account for higher order responses of the encoder 10. The embodiment described above in reference to FIG. 4 corresponds to a 2nd order parametric feedback loop that derives correction based on the 2nd order model being used; two parameters, two loops. The extraction module 110, however, may be extended to a model with 3, 4 or more parameters. In which case, there will be additional feedback loops.

In another embodiment (not shown), the extraction module 110 divides the input signal 5 and the output signal 15 into spectral regions. The gain and delay adjustor 112 generates an adjusted input signal 114 for each of the spectral regions, and, thus, the subtractor 116 obtains the watermark/error signal 20 from differences between the output signal 15 and the adjusted input signal 114 corresponding to each of the spectral regions. In another embodiment, the extraction module 110 includes multiple adjustment signal generators such as 117, one for each spectral region of the input signal 5 and the output signal 15. The outputs of the multiple adjustment signal generators may then be combined and fed to the gain and delay adjustor 112 and thus, again, the subtractor 116 obtains the watermark/error signal 20 from differences between the output signal 15 and the adjusted input signal 114 corresponding to each of the spectral regions. When divided into spectral regions, the embodiment is effectively creating a high order parametric feedback with additional loops.

Figure 5:
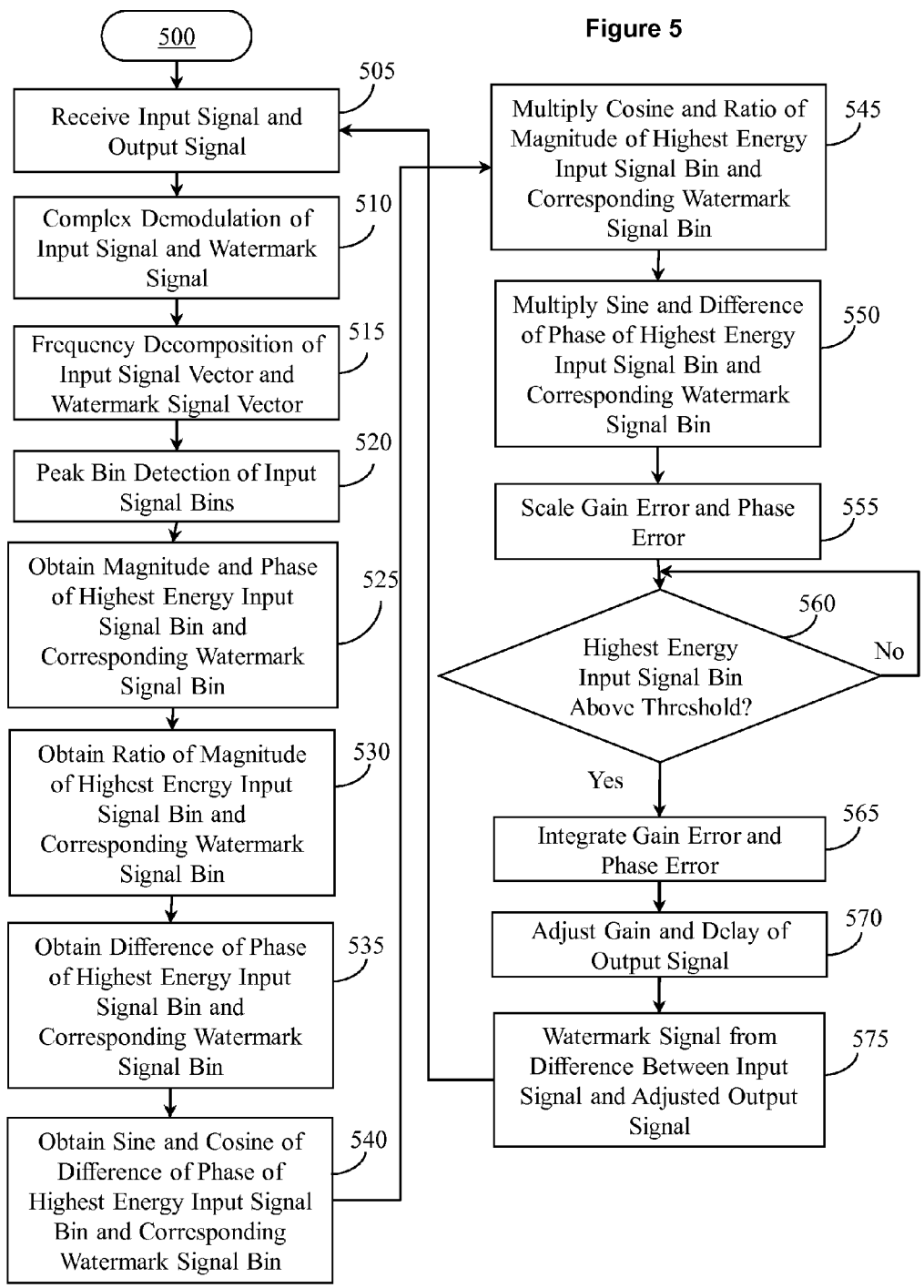
FIG. 5 illustrates a flow diagram for an example method for extracting a watermark signal from an output signal of a watermarking encoder.

Example methods may be better appreciated with reference to the flow diagram of FIG. 5. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 5 illustrates a flow diagram for an example method 500 for extracting a watermark signal from an output signal of a watermarking encoder. At 505 the method 500 includes receiving the input signal and the output signal. The method 500 generates a gain adjustment signal and a delay adjustment signal based on the input signal and the output signal, produces an adjusted input signal based on the gain adjustment signal and the delay adjustment signal, and obtains the watermark/error signal from a difference between the output signal and the adjusted input signal.

At 510, the method 500 includes performing complex demodulation of the input signal and the watermark/error signal to obtain an input signal vector and a watermark/error signal vector, respectively. At 515, the method 500 performs frequency decomposition of the input signal vector and the watermark/error signal vector to obtain input signal bins and watermark/error signal bins, respectively. At 520, the method 500 performs peak bin detection of the input signal bins to identify a highest energy input signal bin. At 525, the method 500 obtains magnitude and phase of the highest energy input signal bin and magnitude and phase of a watermark/error signal bin corresponding to the highest energy input signal bin.

At 530, the method 500 obtains a ratio of the magnitude of the highest energy input signal bin and the magnitude of the watermark/error signal bin corresponding to the highest energy input signal bin. At 535, the method 500 obtains a difference between the phase of the highest energy input signal bin and the phase of the watermark/error signal bin corresponding to the highest energy input signal bin. At 540, the method 500 obtains sine and cosine of the difference between the phase of the highest energy input signal bin and the phase of the watermark/error signal bin corresponding to the highest energy input signal bin.

At 545, the method 500 multiplies the cosine of the difference between the phase of the highest energy input signal bin and the phase of the watermark/error signal bin corresponding to the highest energy input signal bin times the ratio of the magnitude of the highest energy input signal bin and the magnitude of the watermark/error signal bin corresponding to the highest energy input signal bin to obtain a gain error. At 550, the method 500 multiplies the sine of the difference between the phase of the highest energy input signal bin and the phase of the watermark/error signal bin corresponding to the highest energy input signal bin times the ratio of the magnitude of the highest energy input signal bin and the magnitude of the watermark/error signal bin corresponding to the highest energy input signal bin to obtain a phase error. The method 500 generates the gain adjustment signal and the delay adjustment signal based on the gain error and the phase error, respectively.

At 555, the method 500 scales the gain error and the phase error.

At 560, if energy of the highest energy input signal bin is above a threshold, at 565 the method 500 integrates the gain error or a scaled gain error to obtain the gain adjustment signal and the phase error or a scaled phase error to obtain the delay adjustment signal. Back to 560, if energy of the highest energy input signal bin is below the threshold, the method 500 generates the gain adjustment signal as a previous value (i.e., the current value) of the gain adjustment signal and the delay adjustment signal as a previous value (i.e., the current value) of the delay adjustment signal. In one embodiment, the threshold corresponds to the energy of the remaining input signal bins. If the energy of the highest energy input signal bin is larger than the energy of the remaining input signal bins, integration proceeds. If the energy of the highest energy input signal bin is not larger than the energy of the remaining input signal bins, integration is suspended.

At 570, the method 500 adjusts the gain and delay of the input signal based on the gain adjustment signal and the delay adjustment signal, respectively, to obtain the adjusted input signal. At 575, the method 500 obtains the watermark/error signal from a difference between the output signal and the adjusted input signal.

While FIG. 5 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 6:
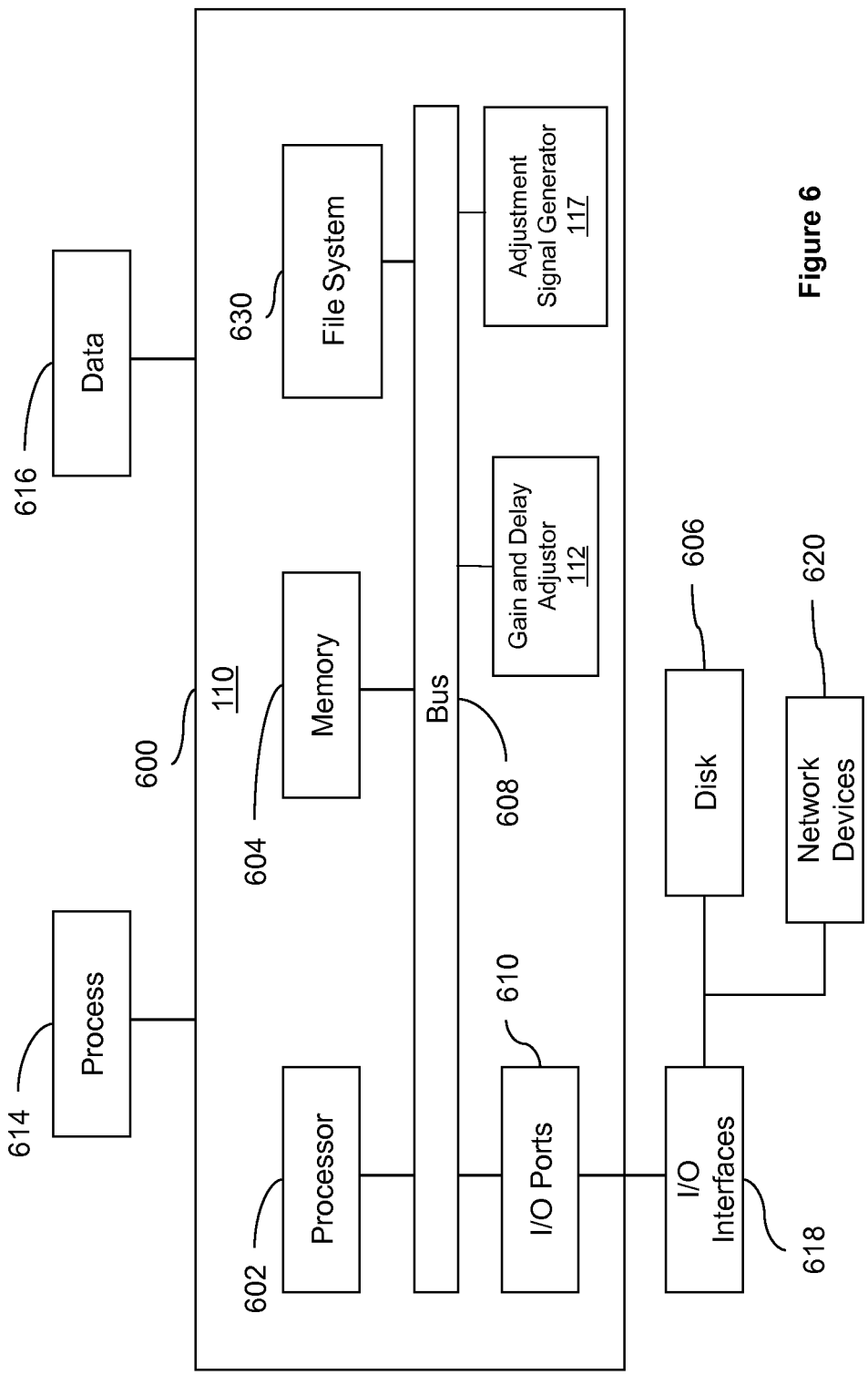
FIG. 6 illustrates a block diagram of an exemplary device for extracting a watermark signal from an output signal of a watermarking encoder.

FIG. 6 illustrates a block diagram of an exemplary device 110 for extracting a watermark signal from an output signal of a watermarking encoder. The device 110 includes a processor 602, a memory 604, and I/O Ports 610 operably connected by a bus 608. In one example, the device 110 may include an adjustment signal generator 117 that generates a gain adjustment signal and a delay adjustment signal based on the input signal and the output signal, and a gain and delay adjustor 112 that adjusts gain and delay of the input signal based on the gain adjustment signal and the delay adjustment signal, respectively, to generate an adjusted input signal. Thus, the adjustment signal generator 117, whether implemented in device 110 as hardware, firmware, software, or a combination thereof may provide means for generating a gain adjustment signal and a delay adjustment signal. Similarly, the gain and delay adjustor 112, whether implemented in device 110 as hardware, firmware, software, or a combination thereof may provide means for adjusting gain and delay of the input signal based on the gain adjustment signal and the delay adjustment signal, respectively, to generate an adjusted input signal. The adjustment signal generator 117 and the gain and delay adjustor 112 may be permanently or removably attached to the device 110.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the device 110 via, for example, an I/O Interfaces (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the device 110.

The bus 608 can be a single internal bus interconnect architecture or other bus or mesh architectures. While a single bus is illustrated, it is to be appreciated that device 110 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device 110 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The device 110 can operate in a network environment and thus may be connected to network devices 620 via the I/O Interfaces 618, or the I/O Ports 610. Through the network devices 620, the device 110 may interact with a network. Through the network, the device 110 may be logically connected to remote computers. The networks with which the device 110 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method for extracting a watermark signal from an output signal of a watermarking encoder, the output signal including an input signal portion corresponding to an input signal to the watermarking encoder and a watermark signal portion corresponding to the watermark signal, the method comprising:

receiving the input signal and the output signal;

generating an adjusted output signal by adjusting gain and delay of the output signal to account for changes in gain and delay in the input signal portion of the output signal introduced by the watermarking encoder or generating an adjusted input signal by adjusting gain and delay of the input signal to account for changes in gain and delay in the input signal portion of the output signal introduced by the watermarking encoder by extracting the phase difference between the input signal and the output signal and extracting the ratio or difference of the magnitudes of the input signal and the output signal; and obtaining the watermark signal from a difference between the input signal and the adjusted output signal or from a difference between the adjusted input signal and the output signal.

2. The method of claim 1, wherein the generating the adjusted output signal or the adjusted input signal includes:

generating a gain adjustment signal and a delay adjustment signal based on the input signal and the output signal; and adjusting the gain and the delay of the output signal or the input signal based on the gain adjustment signal and the delay adjustment signal, respectively, to obtain the adjusted output signal or the adjusted input signal, respectively.

3. The method of claim 1, wherein the generating the adjusted output signal includes:

generating a gain adjustment signal and a delay adjustment signal based on the input signal and the output signal by:
  normalizing the watermark signal to the input signal as a complex vector,
  decomposing the complex vector to obtain a gain error and a phase error,
  generating the gain adjustment signal and the delay adjustment signal based on the gain error and the phase error, respectively; and adjusting the gain and delay of the output signal or the input signal based on the gain adjustment signal and the delay adjustment signal, respectively, to obtain the adjusted output signal or the adjusted input signal, respectively.

4. The method of claim 3, wherein the generating the gain adjustment signal and the delay adjustment signal based on the gain error and the phase error includes:

scaling the gain error and the phase error, integrating the scaled gain error to obtain the gain adjustment signal, and integrating the scaled phase error to obtain the delay adjustment signal.

5. The method of claim 1, wherein the generating the adjusted output signal or the adjusted input signal includes:

generating a gain adjustment signal and a delay adjustment signal based on the input signal and the output signal by:
  normalizing the watermark signal to the input signal as multiple complex vectors demodulated using multiple complex oscillators operating at different frequencies,
  decomposing the multiple complex vectors to obtain multiple gain errors and multiple phase errors corresponding to the different frequencies,
  generating the gain adjustment signal and the delay adjustment signal based on the multiple gain errors and the multiple phase errors, respectively; and adjusting the gain and delay of the output signal or the input signal based on the gain adjustment signal and the delay adjustment signal, respectively, to obtain the adjusted output signal or the adjusted input signal, respectively.

6. The method of claim 1, wherein the generating the adjusted output signal or the adjusted input signal includes:

generating a gain adjustment signal and a delay adjustment signal based on the input signal and the output signal by:
  performing complex demodulation of the input signal and the watermark signal to obtain an input signal vector and a watermark signal vector, respectively,
  performing frequency decomposition of the input signal vector and the watermark signal vector to obtain input signal bins and watermark signal bins, respectively,
  performing peak bin detection of the input signal bins to identify a highest energy input signal bin,
  obtaining magnitude and phase of the highest energy input signal bin and magnitude and phase of a watermark signal bin corresponding to the highest energy input signal bin,
  obtaining a ratio of the magnitude of the highest energy input signal bin and the magnitude of the watermark signal bin corresponding to the highest energy input signal bin,
  obtaining a difference between the phase of the highest energy input signal bin and the phase of the watermark signal bin corresponding to the highest energy input signal bin,
  obtaining sine and cosine of the difference between the phase of the highest energy input signal bin and the phase of the watermark signal bin corresponding to the highest energy input signal bin,
  multiplying the cosine of the difference between the phase of the highest energy input signal bin and the phase of the watermark signal bin corresponding to the highest energy input signal bin times the ratio of the magnitude of the highest energy input signal bin and the magnitude of the watermark signal bin corresponding to the highest energy input signal bin to obtain a gain error,
  multiplying the sine of the difference between the phase of the highest energy input signal bin and the phase of the watermark signal bin corresponding to the highest energy input signal bin times the ratio of the magnitude of the highest energy input signal bin and the magnitude of the watermark signal bin corresponding to the highest energy input signal bin to obtain a phase error, and
  generating the gain adjustment signal and the delay adjustment signal based on the gain error and the phase error, respectively; and adjusting the gain and delay of the output signal or the input signal based on the gain adjustment signal and the delay adjustment signal, respectively, to obtain the adjusted output signal or the adjusted input signal, respectively.

7. The method of claim 6, wherein the performing complex demodulation of the input signal and the watermark signal includes:

generating a complex oscillation signal of the form $\sin(\omega t) + j\cos(\omega t)$;

multiplying the input signal and the complex oscillation signal, and low pass filtering the product of the input signal and the complex oscillation signal to obtain the input signal vector; and multiplying the watermark signal and the complex oscillation signal, and low pass filtering the product of the watermark signal and the complex oscillation signal to obtain the watermark signal vector.

8. The method of claim 6, wherein the performing the frequency decomposition of the input signal vector and the watermark signal vector includes:

performing fast Fourier transforms of the input signal vector and the watermark signal vector to obtain the input signal bins and the watermark signal bins, respectively.

9. The method of claim 6, wherein the generating the gain adjustment signal and the delay adjustment signal based on the gain error and the phase error includes:

if energy of the highest energy input signal bin is above a threshold, integrating the gain error or a scaled gain error to obtain the gain adjustment signal and integrating the phase error or a scaled phase error to obtain the delay adjustment signal; and if energy of the highest energy input signal bin is below the threshold, generating the gain adjustment signal as a previous value of the gain adjustment signal and the delay adjustment signal as a previous value of the delay adjustment signal.

10. The method of claim 1, comprising:

dividing the input signal and the output signal into spectral regions;

generating an adjusted output signal or an adjusted input signal for each of the spectral regions; and obtaining the watermark signal from differences between the input signal and the adjusted output signal in each of the spectral regions or from differences between the adjusted input signal and the output signal in each of the spectral regions.

11. A device for extracting a watermark signal from an output signal of a watermarking encoder, the output signal including an input signal portion corresponding to an input signal to the watermarking encoder and a watermark signal portion corresponding to the watermark signal, the device comprising:

an input configured to receive the input signal and the output signal;

a gain and delay adjustor configured to generate an adjusted output signal by adjusting gain and delay of the output signal to account for changes in gain and delay in the input signal portion of the output signal introduced by the watermarking encoder or to generate an adjusted input signal by adjusting gain and delay of the input signal to account for changes in gain and delay in the input signal portion of the output signal introduced by the watermarking encoder by extracting the phase difference between the input signal and the output signal and extracting the ratio or difference of the magnitudes of the input signal and the output signal; and a subtractor configured to obtain the watermark signal from a difference between the input signal and the adjusted output signal or from a difference between the adjusted input signal and the output signal.

12. The device of claim 11, comprising:

an adjustment signal generator configured to generate a gain adjustment signal and a delay adjustment signal based on the input signal and the output signal, wherein the gain and delay adjustor is configured to receive the gain adjustment signal and the delay adjustment signal, and adjust the gain and the delay of the output signal or the input signal based on the gain adjustment signal and the delay adjustment signal, respectively, to generate the adjusted output signal or the adjusted input signal, respectively.

13. The device of claim 12, wherein the adjustment signal generator is configured to:

normalize the watermark signal to the input signal as a complex vector, decompose the complex vector to obtain a gain error and a phase error, generate the gain adjustment signal and the delay adjustment signal based on the gain error and the phase error, respectively.

14. The device of claim 13, wherein the adjustment signal generator is configured to:

scale the gain error and the phase error, integrate the scaled gain error to obtain the gain adjustment signal, and integrate the scaled phase error to obtain the delay adjustment signal.

15. The device of claim 12, wherein the adjustment signal generator is configured to:

normalize the watermark signal to the input signal as multiple complex vectors demodulated using multiple complex oscillators operating at different frequencies, decompose the multiple complex vectors to obtain multiple gain errors and multiple phase errors corresponding to the different frequencies, and generate the gain adjustment signal and the delay adjustment signal based on the multiple gain errors and the multiple phase errors, respectively.

16. The device of claim 12, wherein the adjustment signal generator is configured to:

perform complex demodulation of the input signal and the watermark signal to obtain an input signal vector and a watermark signal vector, respectively, perform frequency decomposition of the input signal vector and the watermark signal vector to obtain input signal bins and watermark signal bins, respectively, perform peak bin detection of the input signal bins to identify a highest energy input signal bin, obtain magnitude and phase of the highest energy input signal bin and magnitude and phase of a watermark signal bin corresponding to the highest energy input signal bin, obtain a ratio of the magnitude of the highest energy input signal bin and the magnitude of the watermark signal bin corresponding to the highest energy input signal bin, obtain a difference between the phase of the highest energy input signal bin and the phase of the watermark signal bin corresponding to the highest energy input signal bin, obtain sine and cosine of the difference between the phase of the highest energy input signal bin and the phase of the watermark signal bin corresponding to the highest energy input signal bin, multiply the cosine of the difference between the phase of the highest energy input signal bin and the phase of the watermark signal bin corresponding to the highest energy input signal bin times the ratio of the magnitude of the highest energy input signal bin and the magnitude of the watermark signal bin corresponding to the highest energy input signal bin to obtain a gain error, multiply the sine of the difference between the phase of the highest energy input signal bin and the phase of the watermark signal bin corresponding to the highest energy input signal bin times the ratio of the magnitude of the highest energy input signal bin and the magnitude of the watermark signal bin corresponding to the highest energy input signal bin to obtain a phase error, and generate the gain adjustment signal and the delay adjustment signal based on the gain error and the phase error, respectively.

17. The device of claim 16, wherein if energy of the highest energy input signal bin is above a threshold, the adjustment signal generator integrates the gain error or a scaled gain error to obtain the gain adjustment signal and integrate the phase error or a scaled phase error to obtain the delay adjustment signal; or if energy of the highest energy input signal bin is below the threshold, the adjustment signal generator generates the gain adjustment signal as a previous value of the gain adjustment signal and the delay adjustment signal as a previous value of the delay adjustment signal.

18. The device of claim 12, wherein the device divides the input signal and the output signal into spectral regions, the gain and delay adjustor generates an adjusted output signal or an adjusted input signal for each of the spectral regions, and the subtractor obtains the watermark signal from differences between the input signal and the adjusted output signal in each of the spectral regions or from differences between the adjusted input signal and the output signal in each of the spectral regions.

19. A device for extracting a watermark signal from an output signal of a watermarking encoder, the output signal including an input signal portion corresponding to an input signal to the watermarking encoder and a watermark signal portion corresponding to the watermark signal, the device comprising:

an input configured to receive the input signal and the output signal;

an adjustment signal generator configured to generate a gain adjustment signal and a delay adjustment signal based on the input signal and the output signal by extracting the phase difference between the input signal and the output signal and extracting the ratio or difference of the magnitudes of the input signal and the output signal;

a gain and delay adjustor configured to adjust gain and delay of the output signal based on the gain adjustment signal and the delay adjustment signal, respectively, to generate an adjusted output signal or to adjust gain and delay of the input signal based on the gain adjustment signal and the delay adjustment signal, respectively, to generate an adjusted input signal; and an output configured to transmit a difference between the input signal and the adjusted output signal or a difference between the adjusted input signal and the output signal as the watermark signal.

20. The device of claim 19, comprising:

a complex demodulator configured to demodulate the input signal and the watermark signal to normalize the watermark signal to the input signal as a complex vector; and a complex decomposer configured to decompose the complex vector to obtain a gain error and a phase error of the watermark signal to the input signal, wherein the adjustment signal generator is configured to generate the gain adjustment signal and the delay adjustment signal based on the gain error and the phase error, respectively.

* * * * *